United States Patent [19]

Miyazaki et al.

[11] Patent Number: 4,953,943

[45] Date of Patent: Sep. 4, 1990

[54] SECOND HARMONIC WAVE GENERATING DEVICE

[75] Inventors: Yasumitsu Miyazaki, Aichi; Ryo Enomoto; Masaya Yamada, both of Gifu, all of Japan

[73] Assignee: Ibiden Co., Ltd., Gifu-Ken, Japan

[21] Appl. No.: 452,506

[22] Filed: Dec. 19, 1989

[30] Foreign Application Priority Data

Mar. 30, 1989 [JP] Japan .................................. 61-76853
Apr. 7, 1989 [JP] Japan .................................. 61-86885
Nov. 16, 1989 [JP] Japan .................................. 61-298600

[51] Int. Cl.$^5$ ............................................. G02B 6/10
[52] U.S. Cl. ................................ 350/96.12; 350/96.34
[58] Field of Search ............... 350/96.12, 96.13, 96.14, 350/96.34

[56] References Cited

U.S. PATENT DOCUMENTS 4,775,206 10/1988 Erman et al. ................... 350/96/.12
4,778,234 10/1988 Papuchon et al. ............... 350/96.12

Primary Examiner—William L. Sikes
Assistant Examiner—Robert E. Wise
Attorney, Agent, or Firm—Sherman and Shalloway

[57] ABSTRACT

A second harmonic wave generating device comprising a $LiNbO_3$ thin film waveguide layer formed on a $LiTaO_3$ substrate, in which the fundamental wavelength ($\lambda\mu m$), the ordinary refractive index ($n_{oF1}$) of the LiN-waveguide layer, the ordinary refractive index ($n_{oS1}$) of the $LiTaO_3$ substrate at the fundamental wavelength ($\lambda\mu m$), the ordinary refractive index ($n_{oF1}$) of te $LiNbO_3$ thin film waveguide layer at the fundamental wavelength ($\lambda\mu m$), the extraordinary refractive index ($n_{eS2}$) of the $LiTaO_3$ substrate at a second harmonic wavelength ($\lambda\mu m/2$), and the extraordinary refractive index (n e F 2) of the $LiNbO_3$ thin film waveguide layer at the second harmonic wavelength ($\lambda\mu m/2$) are individually within the following specific ranges:

$\lambda = 0.68$ to $0.94$ $\mu m$
$T = 0.3$ to $16$ $\mu m$
$n_{oF1} = 2.22$ to $2.38$
$n_{oS1} = 2.10$ to $2.25$
$n_{eF2} = 2.24$ to $2.43$
$n_{eS2} = 2.22$ to $2.38$

8 Claims, No Drawings

SECOND HARMONIC WAVE GENERATING DEVICE

BACKGROUND OF THE INVENTION

This invention relates to a second harmonic wave generating device having an extremely high conversion efficiency to second harmonic wave, more specifically, to a second harmonic wave generating device (hereinafter referred to as "SHG device") comprising a $LiNbO_3$ thin film wave guide layer formed on a $LiTaO_3$ substrate.

A SHG device utilizes nonlinear optical effects of a nonlinear optical material to convert wavelength $\lambda$ of incident laser light to wavelength $\frac{1}{2}\lambda$, which is outputted. Since the output light has $\frac{1}{2}$ the wavelength of incident light, the device can be used in an optical disc memory and CD player to achieve a 4-times increase in recording density, and can be used in a laser printer and photolithography with enhanced resolution.

Heretofore, a bulk single crystal of a nonlinear optical material using a high-output-power gas laser as a light source has been used as a SHG device. However, with recent increases in demand for compact optical disc systems and laser printers and since gas laser requires an external modulator for optical modulation and is not suited for compact design, a SHG device that enables use of a semiconductor laser, which can be directly modulated and is lower in cost and easier to handle than gas laser, has been in demand.

When a semiconductor laser is used as a light source, since the semiconductor laser generally has a low output power of several mW to several ten mW, a SHG device of a thin film waveguide structure which has a particularly high conversion efficiency has been required.

Optical materials that have nonlinear optical effects and can be used in a SHG device include lithium niobate ($LiNbO_3$), lithium tantalate ($LiTaO_3$), $KTiOPO_4$, $KNbO_3$, $Ba_2NaNb_5O_{15}$, and $Ba_2LiNb_5O_{15}$ and, among these, $LiNbO_3$ is high in nonlinear optical constant and low in optical loss, which makes it most suitable for use in a SHG device.

Heretofore, there have been known methods to form an optical waveguide using $LiNbO_3$, in which a bulk single crystal of $LiNbO_3$ is treated by Ti diffusion, proton exchange, or out-diffusion to form layers with different refractive indices. However, waveguides obtained using these methods have problems in that it is difficult to have great differences in refractive index from the bulk crystal (with respect to laser light of less than 1 $\mu$m in wavelength), is extremely difficult to make phase matching for the generation of the second harmonic wave, that is, to make the refractive index in the waveguide (or effective refractive index) of incident light conforming to the effective refractive index of the second harmonic wave [Yamada and Miyazaki, IEICE Technical Report MW87-113 (1988)], and is difficult to obtain a high conversion efficiency because, since the boundary between the waveguide (layer) and the bulk crystal is not well defined, the light wave tends to diffuse from the waveguide and it is thus difficult to concentrate the optical energy.

The inventors, using a $LiNbO_3$ material and a 0.8 $\mu$m-band semiconductor laser light source, have conducted investigations for a combination that enables phase matching between the fundamental light wave and the second harmonic wave, and found a condition that enables phase matching using a structure comprising a $LiTaO_3$ single crystal having a specific refractive index and a $LiNbO_3$ thin film as a waveguide layer having a specific refractive index formed on the surface of the $LiTaO_3$ single crystal, thus accomplishing a previous invention, which was applied for a patent as Japanese Patent Application No. 63-160804/1988.

However, the previous invention was of a type with a very narrow range of application which was able to use only a 0.8 $\mu$m-band semiconductor laser as a fundamental laser light source. Furthermore, since refractive index of a substance generally varies with wavelength of light applied, the previous invention could not be applied to laser light sources of different wavelengths.

The inventors have conducted intensive studies using a $LiNbO_3$ material into a condition for a SHG device which enables phase matching with laser light sources of different wavelengths. As a result, it has been found that a second harmonic wave generating device comprising a $LiNbO_3$ thin film waveguide layer formed on a $LiTaO_3$ substrate can generate a second harmonic wave very efficiently, by setting individual values of a fundamental wavelength ($\lambda$ $\mu$m), a thickness (T $\mu$m) of the thin film waveguide layer, an ordinary refractive index ($n_{oS1}$) of the substrate at the fundamental wavelength ($\lambda$ $\mu$m), an ordinary refractive index ($n_{oF1}$) of the thin film waveguide layer at the fundamental wavelength ($\lambda$ $\mu$m), an extraordinary refractive index ($n_{eS2}$) of the substrate at a second harmonic wavelength ($\lambda$ $\mu$m/2), and an extraordinary refractive index ($n_{eF2}$) of the thin film waveguide layer at the second harmonic wavelength ($\lambda$ $\mu$m/2) within specific ranges, thus accomplishing the present invention.

SUMMARY OF THE INVENTION

In accordance with the present invention, there is provided a SHG device comprising a $LiNbO_3$ thin film waveguide layer formed on a $LiTaO_3$ substrate, characterized in that a fundamental wavelength ($\lambda$ $\mu$m), a thickness (T $\mu$m) of the $LiNbO_3$ thin film waveguide layer, an ordinary refractive index ($n_{oS1}$) of the $LiTaO_3$ substrate at the fundamental wavelength ($\lambda$ $\mu$m), an ordinary refractive index ($n_{oF1}$) of the $LiNbO_3$ thin film waveguide layer at the fundamental wavelength ($\lambda$ $\mu$m), an extraordinary refractive index ($n_{eS2}$) of the $LiTaO_3$ substrate at a second harmonic wavelength ($\lambda$ $\mu$m/2), and an extraordinary refractive index ($n_{eF2}$) of the $LiNbO_3$ thin film waveguide layer at the second harmonic wavelength ($\lambda$ $\mu$m/2) are individually within the following specific values:

$\lambda = 0.68$ to $0.94$ $\mu$m
$T = 0.3$ to $16$ $\mu$m
$n_{oF1} = 2.22$ to $2.38$
$n_{oS1} = 2.10$ to $2.25$
$n_{eF2} = 2.24$ to $2.42$
$n_{eS2} = 2.22$ to $2.38$ The inventive SHG device is required to have a structure in which a $LiNbO_3$ thin film waveguide layer is formed on a $LiTaO_3$ substrate.

This is because generation of a second harmonic wave in a SHG device comprising a thin film waveguide layer formed on a substrate has the advantages that optical energy concentrated in the thin film and, since the light wave is confined within the thin film and does not diffuse, interaction can be made over a long distance, and phase matching becomes possible by making use of mode dispersion of the thin film using a substance which is not able to make phase matching when used in a SHG device using its bulk material. The reason why LiNbO$_3$ is used in thin film waveguide layer is that LiNbO$_3$ is large in nonlinear optical constant, is small in optical loss, and can be formed into a uniform film. Furthermore, LiTaO$_3$ is similar in crystal structure to the LiNbO$_3$, is easy to form a LiNbO$_3$ thin film on it, and is easy to obtain a high-quality, inexpensive crystal. The LiTaO$_3$ is preferably a single crystal substrate.

The inventive SHG device is required to be used at a fundamental wavelength ($\lambda$ $\mu$m) of 0.68 to 0.94 $\mu$m.

Although it is advantageous to use a fundamental wavelength ($\lambda$ $\mu$m) of as short as possible, it is difficult to generate a laser wave shorter than 0.68 $\mu$m in wavelength by a semiconductor laser. On the other hand, when a fundamental wave of longer than 0.94 $\mu$m in wavelength is used, since the second harmonic wave has a half fundamental wavelength, the resulting second harmonic wave is within the range that can be directly generated by a semiconductor laser, which does not provide an advantage of use of a SHG device. It is preferable to use a fundamental wavelength ($\lambda$) of 0.78 to 0.86 $\mu$m, which is relatively easy to obtain a semiconductor laser light source, and it is practically preferable to use 0.82 to 0.84 $\mu$m.

The inventive SHG device is required to have a thickness (T) of the LiNbO$_3$ thin film waveguide layer in the range from 0.3 to 16 $\mu$m.

If the thickness (T) of the LiNbO$_3$ thin film waveguide layer is smaller than 0.3 $\mu$m, it is difficult to apply the fundamental wave, resulting in a low incident efficiency, and it is difficult to obtain a substantially high SHG conversion efficiency, or a thickness greater than 16 $\mu$m results in a low optical power density and a low SHG conversion efficiency, either of which is difficult to use as a SHG device. It is advantageous for the thin film waveguide layer to have a thickness of 0.5 to 10 $\mu$m, and practically preferable to have a thickness of 1 to 8 $\mu$m.

The inventive SHG device requires that the LiTaO$_3$ substrate has an ordinary refractive index ($n_{oS1}$) of 2.10 to 2.25 at a fundamental wavelength ($\lambda$), the LiNbO$_3$ thin film waveguide layer has an ordinary refractive index ($n_{oF1}$) of 2.22 to 2.38 at the fundamental wavelength ($\lambda$), the LiTaO$_3$ substrate has an extraordinary refractive index ($n_{eS2}$) of 2.22 to 2.38 at a second harmonic wavelength ($\lambda$/2), and the LiNbO$_3$ thin film waveguide layer has an extraordinary refractive index ($n_{eF2}$) of 2.24 to 2.42 at the second harmonic wavelength ($\lambda$/2).

Refractive indices out of the above ranges result in low conversion efficiencies to the second harmonic wave, which are impracticable.

The LiNbO$_3$ thin film waveguide layer and the LiTaO$_3$ substrate having the above refractive indices advantageously contain different elements such as Na, Cr, Mg, Nd, Ti, and/or V to adjust the refractive indices.

The addition of Na, Cr, Nd, or Ti to the LiNbO$_3$ thin film waveguide layer and the LiTaO$_3$ substrate can increase the refractive indices of the LiNbO$_3$ thin film waveguide layer and the LiTaO$_3$ substrate and the addition of Mg or V can decrease the refractive indices of the LiNbO$_3$ thin film waveguide layer and the LiTaO$_3$ substrate.

Na is preferably contained in an amount of 0.1 to 10 mole %. If the amount exceeds 10 mole %, crystals of different structures tend to deposit in the LiNbO$_3$ thin film waveguide layer or the LiTaO$_3$ substrate, which deteriorate their optical characteristics, or if the amount is less than 0.1 mole %, the refractive indices are substantially unchanged, either of which cannot be used to obtain a practically usable SHG device. It is particularly preferable to contain Na in amounts of 0.8 to 2 mole %.

Cr is preferably contained in an amount of 0.02 to 20 mole %. If the amount exceeds 20 mole %, crystals of different structures tend to deposit in the LiNbO$_3$ thin film waveguide layer or the LiTaO$_3$ substrate, which deteriorate their optical characteristics, or if the amount is less than 0.1 mole %, the refractive indices are substantially unchanged, either of which cannot be used to obtain a practically usable SHG device. It is particularly preferable to contain Cr in amounts of 0.2 to 10 mole %.

Mg is preferably contained in an amount of 0.1 to 20 mole %. If the amount exceeds 20 mole %, crystals of different structures tend to deposit in the LiNbO$_3$ thin film waveguide layer or the LiTaO$_3$ substrate, which deteriorate their optical characteristics, or if the amount is less than 0.1 mole %, it has almost no effect to prevent optical damages, either of which cannot be used to obtain a practically usable SHG device. It is particularly preferable to contain Mg in amounts of 2.0 to 10 mole %.

Ti is preferably contained in an amount of 0.2 to 30 mole %. If the amount exceeds 30 mole %, crystals of different structures tend to deposit in the LiNbO$_3$ thin film waveguide layer or the LiTaO$_3$ substrate, which deteriorate their optical characteristics, or if the amount is less than 0.2 mole %, the refractive indices are substantially unchanged, either of which cannot be used to obtain a practically usable SHG device. It is particularly preferable to contain Ti in amounts of 1.0 to 15 mole %.

Nd is preferably contained in an amount of 0.02 to 10 mole %. If the amount exceeds 10 mole %, crystals of different structures tend to deposit in the LiNbO$_3$ thin film waveguide layer or the LiTaO$_3$ substrate, which deteriorate their optical characteristics, or if the amount is less than 0.02 mole %, the refractive indices are substantially unchanged, either of which cannot be used to obtain a practically usable SHG device. It is particularly preferable to contain Nd in amounts of 0.5 to 5 mole %.

V is preferably contained in an amount of 0.05 to 30 mole %. If the amount exceeds 30 mole %, crystals of different structures tend to deposit in the LiNbO$_3$ thin film waveguide layer or the LiTaO$_3$ substrate, which deteriorate their optical characteristics, or if the amount is less than 0.05 mole %, the refractive indices are substantially unchanged, either of which cannot be used to obtain a practically usable SHG device. It is particularly preferable to contain V in amounts of 2.0 to 10 mole %.

The above amounts are indicated in mole % of different elements to the LiNbO$_3$ thin film waveguide layer or the LiTaO$_3$ substrate.

The LiNbO$_3$ thin film waveguide layer containing the above-described different elements such as Na, Cr, Mg, Nd, Ti, and V can be formed on the LiTaO$_3$ substrate using a variety of methods such as previously mixing the raw materials with a different element or its compound and forming a LiNbO$_3$ thin film waveguide layer on a LiTaO$_3$ substrate using a liquid phase epitaxial method, a sputtering method, a metal organic chemical vapor deposition (MOCVD) method, or a molecular beam epitaxial (MBE) method, and methods for containing different elements such as Na, Cr, Mg, Nd, Ti, and V into the LiTaO$_3$ substrate or the LiNbO$_3$ thin film waveguide layer include a diffusion method, an ion implantation method, or the like.

In the inventive SHG device, it is preferable that the thickness (T $\mu$m) of the LiNbO$_3$ thin film waveguide layer, the ordinary refractive index ($n_{oF1}$) of the LiNbO$_3$ thin film waveguide layer at the fundamental wavelength ($\lambda$ $\mu$m), the extraordinary refractive index ($n_{eS2}$) of the LiTaO$_3$ substrate at the second harmonic wavelength ($\lambda$ $\mu$m/2), and the extraordinary refractive index ($n_{eF2}$) of the LiNbO$_3$ thin film waveguide layer at the second harmonic wavelength ($\lambda$ $\mu$m/2) satisfy the equation $$0.01 \leq \frac{(n_{eF2} - n_{eS2})}{T(n_{oF1} - n_{eS2})} \leq 1.1$$

This is because in the SHG device comprising a LiNbO$_3$ thin film waveguide layer formed on a LiTaO$_3$ substrate, if the structure is such that the above equation is not satisfied, a low conversion efficiency to the second harmonic wave will result.

To obtain a particularly high conversion efficiency, it is preferable to satisfy the equation $$0.1 \leq \frac{(n_{eF2} - n_{eS2})}{T(n_{oF1} - n_{eS2})} \leq 0.6$$

more preferably, to satisfy the equation $$0.2 \leq \frac{(n_{eF2} - n_{eS2})}{T(n_{oF1} - n_{eS2})} \leq 0.3$$

In the inventive SHG device, it is preferable that incident angle ($\theta$) of the fundamental wave to the optical axis (Z-axis) of the thin film waveguide layer is within the range 0°±15° or 90°±15°.

This is because, when the incident angle ($\theta$) of the fundamental wave is within the above range, the conversion efficiency to the second harmonic is extremely high. It is particularly advantageous that the incident angle of the fundamental wave is within the range 0°±5° or 90°±5°.

The inventive SHG device is preferably of a channel type with a width of 1 to 10 $\mu$m. The reason why a channel type SHG device is advantageous is that this type of device can have a high optical power density over a slab type. The reason why a width of 1 to 10 $\mu$m is advantageous is that a width smaller than 1 $\mu$m is difficult to introduce incident light into the waveguide and low in incident efficiency, resulting in a low SHG conversion efficiency, and, although a larger width has a higher incident efficiency, a width greater than 10 $\mu$m is low in optical power density, resulting in a low SHG conversion efficiency.

The above-described channel-type SHG device can be produced, for example, by forming the thin film waveguide layer on the substrate by such as sputtering or a liquid phase epitaxial method. Furthermore, a Ti waveguide pattern can be formed on top of the thin film waveguide layer by photolithography and RF sputtering, which can be used as an etching mask in ion beam etching to form a channel-type SHG device.

DESCRIPTION OF PREFERRED EMBODIMENTS

Examples of the present invention will now be described in detail.

EXAMPLE 1-1

Using a liquid phase epitaxial method, LiNbO$_3$ single crystal thin films of different thicknesses comprising a liquid solution containing Mg (5 mole %) were formed on 0.5-mm thick Z-cut LiTaO$_3$ single crystal substrates. The surfaces and both end faces of the devices were mirror-finished to allow transmission of light through the end faces, thus forming SHG devices. For a fundamental wavelength $\lambda$ of 0.83 $\mu$m, the LiTaO$_3$ single crystal substrate had an ordinary refractive index ($n_{oS1}$) of 2.141, the LiNbO$_3$ single crystal thin film waveguide layer had an ordinary refractive index ($n_{oF1}$) of 2.271, the LiTaO$_3$ single crystal substrate had an extraordinary refractive index ($n_{eS2}$) of 2.261 at the second harmonic wavelength $\lambda$/2, and the LiNbO$_3$ single crystal thin film waveguide layer had an extraordinary refractive index ($n_{eF2}$) of 2.268 at the second harmonic wavelength $\lambda$/2.

In this SHG device, the Mg-containing LiNbO$_3$ thin film had a thickness of 2.92 $\mu$m.

This SHG device corresponds to $$\frac{(n_{eF2} - n_{eS2})}{T(n_{oF1} - n_{eS2})} = 0.23$$

To the SHG device, a 40 mW semiconductor laser of 0.83 $\mu$m in wavelength was applied with an incident angle of 90° with respect to the optical axis (Z-axis) of the single crystal thin film. As a result, the SHG device exhibited a very high SHG conversion efficiency of 13.4%.

EXAMPLE 1-2

Using a procedure substantially same as used in Example 1-1, a SHG device was fabricated using a Mg-containing LiNbO$_3$ thin film having a thickness of 9.8 $\mu$m.

This SHG device corresponds to $$\frac{(n_{eF2} - n_{eS2})}{T(n_{oF1} - n_{eS2})} = 0.06$$

To the SHG device, a 40 mW semiconductor laser of 0.83 $\mu$m in wavelength was applied with an incident angle of 90° with respect to the optical axis (Z-axis) of the single crystal thin film. As a result, the SHG device exhibited a sufficiently high SHG conversion efficiency of 1.0%.

EXAMPLE 1-3

Using a procedure substantially same as used in Example 1-1, a SHG device was fabricated using a Mg-containing LiNbO$_3$ thin film having a thickness of 0.7 $\mu$m.

This SHG device corresponds to $$\frac{(n_{eF2} - n_{eS2})}{T(n_{oF1} - n_{eS2})} = 0.06$$

To the SHG device, a 40 mW semiconductor laser of 0.83 $\mu$m in wavelength was applied with an incident angle of 90° with respect to the optical axis (Z-axis) of the single crystal thin film. As a result, the SHG device exhibited a sufficiently high SHG conversion efficiency of 1.3%.

EXAMPLE 2-1

Using a RF sputtering method, LiNbO$_3$ single crystal thin films of different thicknesses comprising a liquid solution containing Nd (1 mole %) were formed on 0.5-mm thick X-cut LiTaO$_3$ single crystal substrates. The surfaces and both end faces of the devices were mirror-finished to allow transmission of light through the end faces, thus forming SHG devices. For a fundamental wavelength λ of 0.9 μm, the LiTaO$_3$ single crystal substrate had an ordinary refractive index ($n_{oS1}$) of 2.141, the Nd-containing LiNbO$_3$ single crystal thin film waveguide layer had an ordinary refractive index ($n_{oF1}$) of 2.275, the LiTaO$_3$ single crystal substrate had an extraordinary refractive index ($n_{eS2}$) of 2.245 at the second harmonic wavelength λ/2, and the LiNbO$_3$ single crystal thin film waveguide layer had an extraordinary refractive index ($n_{eF2}$) of 2.268 at the second harmonic wavelength λ/2.

In this SHG device, the Mg-containing LiNbO$_3$ thin film had a thickness of 5.92 μm.

This SHG device corresponds to $$\frac{(n_{eF2} - n_{eS2})}{T(n_{oF1} - n_{eS2})} = 0.13$$

To the SHG device, a 40 mW semiconductor laser of 0.9 μm in wavelength was applied with an incident angle of 0° with respect to the optical axis (Z-axis) of the single crystal thin film. As a result, the SHG device exhibited a very high SHG conversion efficiency of 11.0%.

EXAMPLE 2-2

Using a procedure substantially same as used in Example 2-1, a SHG device was fabricated using a Nd-containing LiNbO$_3$ thin film having a thickness of 14.8 μm.

This SHG device corresponds to $$\frac{(n_{eF2} - n_{eS2})}{T(n_{oF1} - n_{eS2})} = 0.05$$

To the SHG device, a 40 mW semiconductor laser of 0.9 μm in wavelength was applied with an incident angle of 0° with respect to the optical axis (Z-axis) of the single crystal thin film. As a result, the SHG device exhibited a sufficiently high SHG conversion efficiency of 0.5%.

EXAMPLE 2-3

Using a procedure substantially same as used in Example 2-1, a SHG device was fabricated using a Nd-containing LiNbO$_3$ thin film having a thickness of 0.7 μm.

This SHG device corresponds to $$\frac{(n_{eF2} - n_{eS2})}{T(n_{oF1} - n_{eS2})} = 1.10$$

To the SHG device, a 40 mW semiconductor laser of 0.9 μm in wavelength was applied with an incident angle of 0° with respect to the optical axis (Z-axis) of the single crystal thin film. As a result, the SHG device exhibited a sufficiently high SHG conversion efficiency of 1.3%.

EXAMPLE 3-1

Using a liquid phase epitaxial method, LiNbO$_3$ single crystal thin films of different thicknesses comprising a liquid solution containing 1 mole % Na and 5 mole % MgO were formed on 0.5-mm thick Y-cut LiTaO$_3$ single crystal substrates. The surfaces and both end faces of the devices were mirror-finished to allow transmission of light through the end faces, thus forming SHG devices. For a fundamental wavelength λ of 0.78 μm, the LiTaO$_3$ single crystal substrate had an ordinary refractive index ($n_{oS1}$) of 2.153, the 1 mole % Na/5 mole % MgO-containing LiNbO$_3$ single crystal thin film waveguide layer had an ordinary refractive index ($n_{oF1}$) of 2.281, the LiTaO$_3$ single crystal substrate had an extraordinary refractive index ($n_{eS2}$) of 2.272 at the second harmonic wavelength λ/2, and the 1 mole % Na/5 mole % MgO-containing LiNbO$_3$ single crystal thin film waveguide layer had an extraordinary refractive index ($n_{eF2}$) of 2.27 at the second harmonic wavelength λ/2.

In this SHG device, the 1 mole % Na/5 mole % MgO-containing LiNbO$_3$ thin film had a thickness of 2.10 μm.

This SHG device corresponds to $$\frac{(n_{eF2} - n_{eS2})}{T(n_{oF1} - n_{eS2})} = 0.22$$

To the SHG device, a 40 mW semiconductor laser of 0.78 μm in wavelength was applied with an incident angle of 90° with respect to the optical axis (Z-axis) of the single crystal thin film. As a result, the SHG device exhibited a very high SHG conversion efficiency of 11.0%.

EXAMPLE 3-2

Using a procedure substantially same as used in Example 3-1, a SHG device was fabricated using a Na/MgO-containing LiNbO$_3$ thin film having a thickness of 10.4 μm.

This SHG device corresponds to $$\frac{(n_{eF2} - n_{eS2})}{T(n_{oF1} - n_{eS2})} = 0.04$$

To the SHG device, a 40 mW semiconductor laser of 0.78 μm in wavelength was applied with an incident angle of 90° with respect to the optical axis (Z-axis) of the single crystal thin film. As a result, the SHG device exhibited a sufficiently high SHG conversion efficiency of 1.1%.

EXAMPLE 3-3

Using a procedure substantially same as used in Example 3-1, a SHG device was fabricated using a Na/MgO-containing LiNbO$_3$ thin film having a thickness of 0.5 μm.

This SHG device corresponds to $$\frac{(n_{eF2} - n_{eS2})}{T(n_{oF1} - n_{eS2})} = 0.89$$

To the SHG device, a 40 mW semiconductor laser of 0.78 μm in wavelength was applied with an incident angle of 90° with respect to the optical axis (Z-axis) of the single crystal thin film. As a result, the SHG device exhibited a sufficiently high SHG conversion efficiency of 1.2%.

As described above, the present invention can provide a SHG device comprising a LiNbO3 thin film waveguide layer formed on a LiTaO3 substrate, which has an extremely high SHG conversion efficiency.

We claim:

1. A second harmonic wave generating device comprising a LiNbO3 thin film waveguide layer formed on a LiTaO3 substrate, characterized in that a fundamental wavelength (λ μm), a thickness (T μm) of said LiNbO3 thin film waveguide layer, an ordinary refractive index ($n_{oS1}$) of said LiTaO3 substrate at said fundamental wavelength (λ μm), an ordinary refractive index ($n_{oF1}$) of said LiNbO3 thin film waveguide layer at said fundamental wavelength (λ μm), an extraordinary refractive index ($n_{eS2}$) of said LiTaO3 substrate at a second harmonic wavelength (λ μm/2), and an extraordinary refractive index ($n_{eF2}$) of said LiNbO3 thin film waveguide layer at said second harmonic wavelength (λ μm/2) are individually within the following specific values:

λ=0.68 to 0.94 μm
T=0.3 to 16 μm
$n_{oF1}$=2.22 to 2.38
$n_{oS1}$=2.10 to 2.25
$n_{eF2}$=2.24 to 2.42
$n_{eS2}$=2.22 to 2.38

2. The second harmonic wave generating device as claimed in claim 1 wherein said thickness (T μm) of said LiNbO3 thin film waveguide layer, said ordinary refractive index ($n_{oF1}$) of said LiNbO3 thin film waveguide layer at said fundamental wavelength (λ μm), said extraordinary refractive index ($n_{eS2}$) of said LiTaO3 substrate at said second harmonic wavelength (λ μm/2), and said extraordinary refractive index ($n_{eF2}$) of said LiNbO3 thin film waveguide layer at said second harmonic wavelength (λ μm/2) are represented by Equation (α)

$$0.01 \leq \frac{(n_{eF2} - n_{eS2})}{T(n_{oF1} - n_{eS2})} \leq 1.1$$

3. The second harmonic wave generating device as claimed in claim 1 wherein incident angle (θ) of said fundamental wave to the optical axis (Z-axis) of said thin film waveguide layer is 0°±15° or 90°±15°.

4. The second harmonic wave generating device as claimed in claim 1 wherein said fundamental wavelength (λ μm) is 0.78 to 0.86 μm.

5. The second harmonic wave generating device as claimed in claim 1 wherein said LiNbO3 thin film waveguide layer has a thickness of 0.5 to 10 μm.

6. The second harmonic wave generating device as claimed in claim 1 wherein said LiTaO3 substrate is a single crystal substrate.

7. The second harmonic wave generating device as claimed in claim 1 wherein said LiNbO3 thin film waveguide layer and said LiTaO3 substrate contain one or more different elements selected from the group consisting of Na, Cr, Mg, Nd, Ti, and V.

8. The second harmonic wave generating device as claimed in claim 1 of a channel type having a width of 1 to 10 μm.

* * * * *